Aug. 19, 1952      B. DENZLER      2,607,274
WORK HOLDER
Filed July 19, 1947
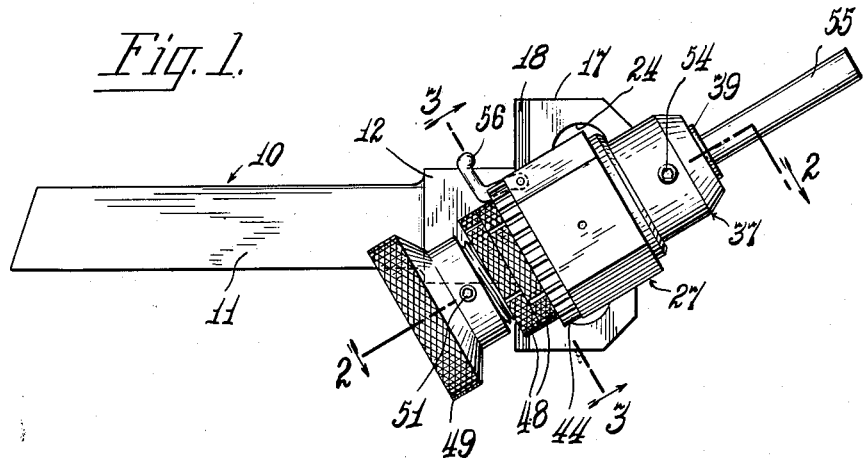
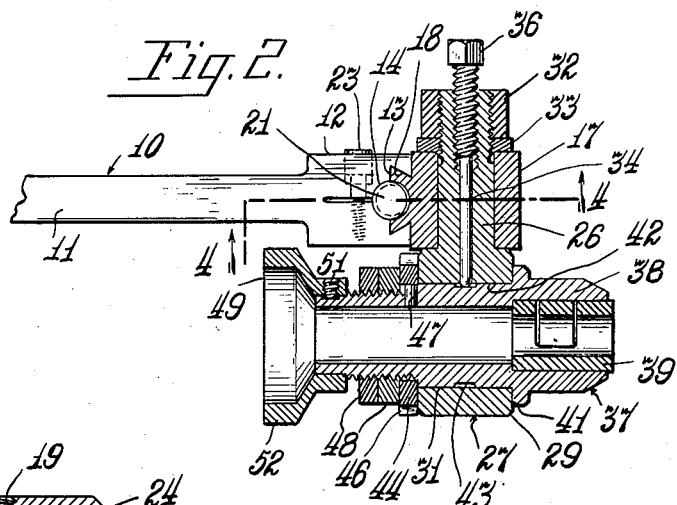
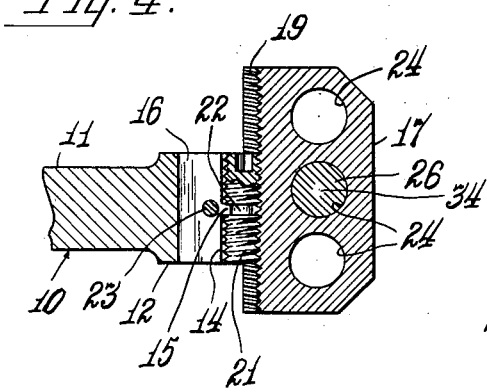
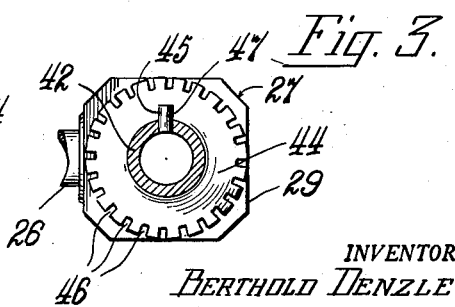
INVENTOR.
BERTHOLD DENZLER
BY
ATTORNEY Patented Aug. 19, 1952

2,607,274

UNITED STATES PATENT OFFICE 2,607,274

WORK HOLDER

Berthold Denzler, Chicago, Ill., assignor to Davos Products Company, Chicago, Ill., a copartnership consisting of Filip Brandhandler and Berthold Denzler Application July 19, 1947, Serial No. 762,071

1 Claim. (Cl. 90—59)

This invention relates to a tool or work holder for use on machine tools and the like.

One of the objects of my invention is the provision of a tool holder of the type described which is universally adjustable so as to permit the positioning of the tool or work for the performance of a variety of operations with a minimum of set up operations.

Another object of my invention is the provision of a tool or work holder of the foregoing character which is intended for use in a conventional lathe tool post.

A further object of my invention is a provision of a tool or work holder having an indexing head, which permits indexing, about an axis of rotation, of a tool or work piece clamped therein.

A further object of my invention is the provision of a tool or work holder of the foregoing character which is quickly and easily adjustable and rugged in construction.

Other and further objects of the present invention will be apparent from the following descriptions and claim, and are illustrated in the accompanying drawings which, by way of illustration, show preferred embodiments and the principles thereof. Other embodiments of the invention embodying the same principle may be used, and structural changes may be made as desired by those skilled in the art, without departing from the present invention and the purview of the appended claim.

In the drawings:

Fig. 1 is an elevational view of my invention showing the same in one position of adjustment.

Fig. 2 is a cross-sectional view taken on line 2—2 of Fig. 1.

Fig. 3 is a cross-sectional view taken on line 3—3 of Fig. 1.

Fig. 4 is a cross-sectional view taken on line 4—4 of Fig. 2.

Referring to the drawing wherein is shown a preferred embodiment of my invention, the numeral 10 designates generally an elongated shank having a body portion 11 adapted for clamping in a conventional tool post of a machine tool. One end portion 12 of the shank is enlarged and is provided with a dovetail channel 13 extending vertically, as shown in Fig. 4. The enlarged end portion 12 is provided with a semi-circular groove 14 extending coextensively with the channel 13 and is also slotted in a longitudinal direction, as at 16. The groove 14 is restricted substantially medially to provide a yoke or shoulder 15 for a purpose as will be hereinafter described.

A head 17 substantially of greater height than the end portion 12 is provided along one face longitudinally thereof with a complemental dovetail guide 18 intended to be slidably received in the channel 13. The guide 18 is provided with a semi-circular groove 19 extending longitudinally thereof, the groove being threaded for its full length. When the head 17 and the end portion 12 are in assembled relation, as shown particularly in Fig. 2, the semi-circular grooves 14 and 19 form a bore, circular in cross-section, one half of which is threaded to receive a threaded stud 21. The said stud is preferably of the hollow head type and is undercut medially as at 22 to accommodate the yoke or shoulder 15 which serves to confine the stud. Upon rotation of the stud 21, the head 17 is caused to move in a direction longitudinally of said stud, thus the position of the head 17, relative to the shank 11, may be easily adjusted. A set screw 23, extending transversely of the end portion 12, is arranged to lock the head 17 in any position of adjustment. The head 17 may be provided with one or more bores 24 to receive the supporting spindle 26 of the indexing head indicated generally by the numeral 27 and presently to be described.

The indexing head 27 comprises a body member 29, having a bore 31 extending therethrough and provided with an integrally connected spindle 26, the axis of which is disposed at a right angle to the axis of the bore 31. The end of the spindle 26 is threaded to receive a lock nut 32 and washer 33, for locking the dividing head 27 in any position of adjustment about its axis of rotation. The spindle 26 is bored axially to slidably accommodate a pin 34 and is counterbored and threaded to receive a set screw 36.

A hollow spindle generally indicated by the numeral 37 is rotatably supported in the bore 31 of the body member 29 and includes an enlarged end portion 38 in the bore of which is accommodated a clamping member or chuck 39 as will be hereinafter described. A shoulder 41 formed on the spindle 37 abuts the body 29 and acts as a thrust bearing. The bearing portion 42 of the spindle is provided with a shallow annular groove 43, against the bottom of which the pin 34 abuts to lock the spindle 37 in a position of adjustment.

An annular member 44 having a plurality of circumferentially spaced recesses 46 is mounted on the spindle 37 and is keyed thereto against relative rotation by a pin 47 which is fixed in the spindle and which projects into a keyway 45 of the member 44. A pair of knurled locknuts 48 are provided to retain the parts in assembled relation.

A hollow member 49 is mounted on the end of the spindle 37 and is locked thereon by a set screw 51. The member 49 is provided with an enlarged portion 52, the outer surface of which is preferably knurled and serves as a convenient means for rotating the spindle 37.

The clamping member or chuck 39 comprises a tubular section in which a portion of the wall thereof has been cut out and a wall section of similar curvature, but dimensionally slightly smaller, has been inserted in the cut out thereby formed. A set screw 54 in the spindle 37 is intended to engage the wall section to urge the same inwardly to cause it to clamp against the shank of a tool, or work piece 55, projecting through the hollow spindle.

An L-shaped finger member 56 is pivoted in a recess provided in the body member 29 and is intended to be swung into or out of engagement with one of the slots 46 of the annular member 44, to lock or unlock the same against or for rotation. Since the member 44 is keyed to the hollow spindle 37, the spindle correspondingly may be locked in a selected position of adjustment.

In use, the device of my invention may be clamped in a conventional tool post of a machine tool, such as a lathe or milling machine, and a tool or work piece 55, inserted in the bore of the hollow spindle 37 and clamped therein. With the set screw 36 loosened and the member 56 pivoted out of engagement with the annular member 44, the work piece or tool 55 may be indexed by rotating the member 49 to any position of adjustment and then locked in the desired position by tightening the set screw 36 and moving the member 56 into engagement with a slot 46. The dividing or indexing head 27 may be rotated about the axis of the spindle 37 and locked in any position of adjustment by tightening the lock nut 32. An adjustment of the dividing head 27 in a vertical direction may be readily effected by rotating the stud 21 with a suitable wrench in one direction or another to move the head relative to the shank. Further adjustment in a vertical direction may be accomplished by positioning the spindle 26 in any one of the bores 24 provided in the head 17.

It will thus be seen that I have provided a tool or work holder which is arranged to permit substantially universal adjustment of the tool or work, thus materially reducing the set up operations required over the presently known devices.

I claim:

A tool or work holder comprising a shank adapted for clamping in a tool post of a machine tool, a head directly mounted on said shank, said shank and head having complementary dovetail guide means for permitting relative movement of said head to said shank in a transverse direction, screw means for so moving said head, a body member including a bearing extending through and journalled in said head and movable about an axis transverse to the longitudinal axis of the shank, a hollow spindle rotatably supported in said body member and rotatable about an axis at right angles to said first-mentioned axis, spindle engaging means extending through the bearing for locking the spindle against rotation, means in said spindle for clamping a tool or work piece therein, and means associated with said spindle for indexing and locking the same in one of a plurality of positions about its axis of rotation.

BERTHOLD DENZLER.

REFERENCES CITED

The following references are of record in the file of this patent:

UNITED STATES PATENTS

| Number | Name | Date |
|---|---|---|
| 767,598 | Search et al. | Aug. 16, 1904 |
| 1,260,271 | Kramer | Mar. 19, 1918 |
| 2,434,600 | Swenson | Jan. 13, 1948 |
| 2,452,089 | Wiken | Oct. 26, 1948 |